(12) United States Patent
Goh et al.

(10) Patent No.: US 12,321,787 B2
(45) Date of Patent: Jun. 3, 2025

(54) SERVER CLASSIFICATION USING MACHINE LEARNING TECHNIQUES

(71) Applicant: Dell Products L.P., Round Rock, TX (US)

(72) Inventors: Wai Teck Goh, Cyberjaya Selangor (MY); Say Heian Lee, Cyberjaya (MY)

(73) Assignee: Dell Products L.P, Round Rock, TX (US)

(*) Notice: Subject to any disclaimer, the term of this patent is extended or adjusted under 35 U.S.C. 154(b) by 513 days.

(21) Appl. No.: 17/345,453

(22) Filed: Jun. 11, 2021

(65) Prior Publication Data

US 2022/0398132 A1 Dec. 15, 2022

(51) Int. Cl.
*G06F 9/48* (2006.01)
*G06F 9/50* (2006.01)
(Continued)

(52) U.S. Cl.
CPC ............ *G06F 9/505* (2013.01); *G06F 9/48* (2013.01); *G06F 9/4843* (2013.01); *G06F 9/4881* (2013.01); *G06F 9/50* (2013.01); *G06F 9/5083* (2013.01); *G06F 9/5088* (2013.01); *G06F 11/30* (2013.01); *G06F 11/3006* (2013.01); *G06F 11/3055* (2013.01); *G06F 11/3096* (2013.01); *G06F 11/3423* (2013.01);
(Continued)

(58) Field of Classification Search
CPC ........ G06F 9/48; G06F 9/4843; G06F 9/4881; G06F 9/50; G06F 9/505; G06F 9/5083; G06F 9/5088; G06F 11/30; G06F 11/3006; G06F 11/3055; G06F 11/3096; G06F 11/3423; G06F 11/3447; G06F 18/285; G06N 20/10; G06N 20/20
See application file for complete search history.

(56) References Cited

U.S. PATENT DOCUMENTS 10,048,996 B1 * 8/2018 Bell .................. G06F 11/3006
10,613,962 B1 * 4/2020 Delange ............. G06F 11/3006
(Continued)

OTHER PUBLICATIONS

Brownlee, J., How to Compare Machine Learning Algorithms in Python with scikit-learn (machinelearningmastery.com), Jun. 1, 2016.

*Primary Examiner* — Charles M Swift
(74) *Attorney, Agent, or Firm* — Ryan, Mason & Lewis, LLP

(57) ABSTRACT

Methods, apparatus, and processor-readable storage media for server classification using machine learning techniques are provided herein. An example computer-implemented method includes obtaining, from at least one data source, data pertaining to server activity attributed to one or more servers; processing at least a portion of the obtained data using one or more rule-based analyses; selecting at least a particular machine learning classification algorithm from a set of multiple machine learning classification algorithms, based at least in part on results from the processing and one or more portions of the obtained data; classifying an activity level of at least a portion of the one or more servers by processing at least a portion of the obtained data using the selected machine learning classification algorithm; and performing at least one automated action based at least in part on results of the classifying.

16 Claims, 8 Drawing Sheets

(51) Int. Cl.
G06F 11/30 (2006.01)
G06F 11/34 (2006.01)
G06F 18/20 (2023.01)
G06N 20/00 (2019.01)

(52) U.S. Cl.
CPC ........ G06F 11/3447 (2013.01); G06F 18/285 (2023.01); G06N 20/00 (2019.01)

(56) References Cited

U.S. PATENT DOCUMENTS

| | | | |
|---|---|---|---|
| 10,705,873 B2* | 7/2020 | Feng | G06F 9/4831 |
| 2013/0067469 A1* | 3/2013 | Das | G06F 9/5077 |
| | | | 718/1 |
| 2015/0178637 A1* | 6/2015 | Bogojeska | G06N 5/04 |
| | | | 706/12 |
| 2016/0269479 A1* | 9/2016 | Jing | H04L 67/10 |
| 2019/0349273 A1* | 11/2019 | Rikovic Tabak | G06F 11/3447 |
| 2020/0175161 A1* | 6/2020 | Giaconi | G06N 3/084 |
| 2021/0406346 A1* | 12/2021 | Shiue | G06N 20/20 |
| 2022/0309425 A1* | 9/2022 | Hatfield | G06Q 10/0635 |

* cited by examiner

```
import sys
import numpy as np
from pybix import ZabbixAPI
host="zbxnldb03.us.enterpriseX.com"
print("Host name ", host)

#using defaults Zabbix API
with ZabbixAPI("http://10.xxx.142.yy/zabbix") as ZAPI:
# using defaults for user, password
ZAPI.login("zbxapi_poc", "zbxapi_poc")

# Print all monitored hosts
for host in ZAPI.host.get (output="extend",filter ={ "host" : host}, monitored_hosts=1):
    id= host['hostid']
    print(id)

# Print all monitored hosts CPU utilization
for host in ZAPI.item.get (output="extend",hostids= id ,sortfield= "name", search= {'key_':
['system.cpu.util[,user]','system.cpu.util[,system]']},searchByAny= "True"):
    itid= host['itemid']
    print(host['itemid'] , host['key_'], host['name'])

# Print all monitored hosts CPU utilization
for host in ZAPI.history.get (output="extend",history= 0,itemids= host['itemid'], sortfield= 'clock', sortorder= "DESC", limit="10"):
    cpuval = float(host['value'])
    b= np.empty(1)
    def push(x, item):
        x += [item]
        return x
    push(b,cpuval)
    b = b / 10
    print(b)
```

| | POSITIVE (HYPERACTIVE) | NEGATIVE (INACTIVE) |
|---|---|---|
| HYPERACTIVE | TRUE POSITIVE (TP) = TRUE HYPERACTIVE SERVER | FALSE NEGATIVE (FN) = FALSE HYPERACTIVE SERVER |
| INACTIVE | FALSE POSITIVE (FP) = FALSE INACTIVE SERVER | TRUE NEGATIVE (TN) = TRUE INACTIVE SERVER |

| TRUE HYPERACTIVE SERVER | HIGH USAGE WITH APPLICATION OR DATABASE RUNNING PROCESSES |
|---|---|
| FALSE HYPERACTIVE SERVER | FALSE HIGH USAGE DUE TO UPDATE AND SECURITY AGENTS RUNNING ACTIVITY |
| TRUE INACTIVE SERVER | TRUE LOW USAGE |
| FALSE INACTIVE SERVER | LOW USAGE WITH MINOR APPLICATION OR DATABASE RUNNING ACTIVITY |

| ITEM DETAILS | AVERAGE VALUE |
|---|---|
| NUMBER OF RUNNING PROCESSES | 1 |
| SYSTEM UPTIME | 200 DAYS |
| CPU IDLE TIME | 97.95% |
| CPU USAGE | 1.478% |
| FREE MEMORY | 83% |
| LOGIN HISTORY - LAST 6 MONTHS | 0 |
| EXTERNAL APPLICATION NETWORK ACTIVITY | 0 |

| ITEM DETAILS | AVERAGE VALUE |
|---|---|
| NUMBER OF RUNNING PROCESSES | 19 |
| SYSTEM UPTIME | 20 DAYS |
| CPU IDLE TIME | 35.95% |
| CPU USAGE | 65.478% |
| FREE MEMORY | 43% |
| LOGIN HISTORY - LAST 6 MONTHS | 12 |
| EXTERNAL APPLICATION NETWORK ACTIVITY | 3 |

| VM# | CPU (AVG %) | MEMORY (AVG %) | NETWORK IO (AVG %) | CLASS |
|---|---|---|---|---|
| 1 | 30 | 85 | 40 | 1 (HYPERACTIVE) |
| 2 | 10 | 30 | 20 | 0 (INACTIVE) |
| 3 | 25 | 90 | 40 | 1 |

```
import scipy
import numpy
import matplotlib
import pandas
import sklearn

# Load dataset from repository
Repo_URL =
"https://raw.githubusercontent.com/xxxx/Datasets/master/vm.csv"
VM_Metrics = ['vm', 'cpu', 'memory', 'network', 'class']
VM_Dataset = read_csv(Repo_URL, names=VM_Metrics)

# Split the validation dataset
VM_Array = VM_Dataset.values
X = VM_Array[:,0:4]
y = VM_Array[:,4]
X_train, X_validation, Y_train, Y_validation = train_test_split(X, y,
test_size=0.30, random_state=5)

# Prepare 4 model ML algorithms
Models = []
Models.append(('SVM', SVC()))
Models.append(('KNN', KNeighborsClassifier()))
Models.append(('CART', DecisionTreeClassifier()))
Models.append(('NB', GaussianNB()))

... [Continued in 900b]
```

900b

```
... [Continued from 900a]

# Evaluate each model in a loop
Results = []
Names = []
for Name, Model in Models:
    CF_Results = confusion_matrix(Model, X_train, Y_train,
scoring='accuracy')
    Results.append(CF_Results)
    Names.append(Name)
    print('%s: %f (%f)' % (Name, CF_Results.mean(), CF_Results.std()))

# Algorithm comparison
pyplot.boxplot(Results, labels=Names)
pyplot.title('Algorithm Comparison')
pyplot.show()

# Make predictions on validation dataset using KNN
Model = KNeighborsClassifier()
Model.fit(X_train, Y_train)
VM_Predictions = Model.predict(X_validation)

# Select the best prediction
print(accuracy_score(Y_validation, VM_Predictions))
print(confusion_matrix(Y_validation, VM_Predictions))
print(classification_report(Y_validation, VM_Predictions))
```

SERVER CLASSIFICATION USING MACHINE LEARNING TECHNIQUES

FIELD

The field relates generally to information processing systems, and more particularly to server management using such systems.

BACKGROUND

Server management commonly includes attempting to determine whether a server (e.g., a virtual machine (VM) server) is active or inactive. However, conventional management approaches often result in improper server decommissioning and/or over-reclamation, which can cause outages. For example, inactive VM servers can occasionally consume high levels of central processing unit (CPU) resources and memory resources (e.g., running virus scans, software updates, etc.), which conventional approaches can misinterpret as active; while active VM servers with lightweight jobs (e.g., text editing) can show close to zero resource utilization, which conventional approaches can misinterpret as inactive.

SUMMARY

Illustrative embodiments of the disclosure provide techniques for server classification using machine learning techniques. An exemplary computer-implemented method includes obtaining, from at least one data source, data pertaining to server activity attributed to one or more servers, processing at least a portion of the obtained data using one or more rule-based analyses, and selecting at least a particular machine learning classification algorithm from a set of multiple machine learning classification algorithms, based at least in part on results from the processing and one or more portions of the obtained data. Additionally, the method also includes classifying an activity level of at least a portion of the one or more servers by processing at least a portion of the obtained data using the selected machine learning classification algorithm, and performing at least one automated action based at least in part on results of the classifying.

Illustrative embodiments can provide significant advantages relative to conventional server management approaches. For example, problems associated with these conventional approaches are overcome in one or more embodiments through automatically classifying server activity using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example code snippet for implementing at least a portion of a data collection mechanism in an illustrative embodiment.

FIG. 3 shows an example confusion matrix used for algorithm selection in an illustrative embodiment.

FIG. 4 shows example server labels in an illustrative embodiment.

FIG. 6 shows example data for VM server classification in an illustrative embodiment.

FIG. 7 shows example data for VM server classification in an illustrative embodiment.

FIG. 8 shows an example VM server dataset used to train a model in an illustrative embodiment.

FIG. 9 shows example code snippets for training one or more models, selecting an optimal algorithm, and generating a prediction in an illustrative embodiment.

DETAILED DESCRIPTION

Illustrative embodiments will be described herein with reference to exemplary computer networks and associated computers, servers (e.g., VM servers), network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
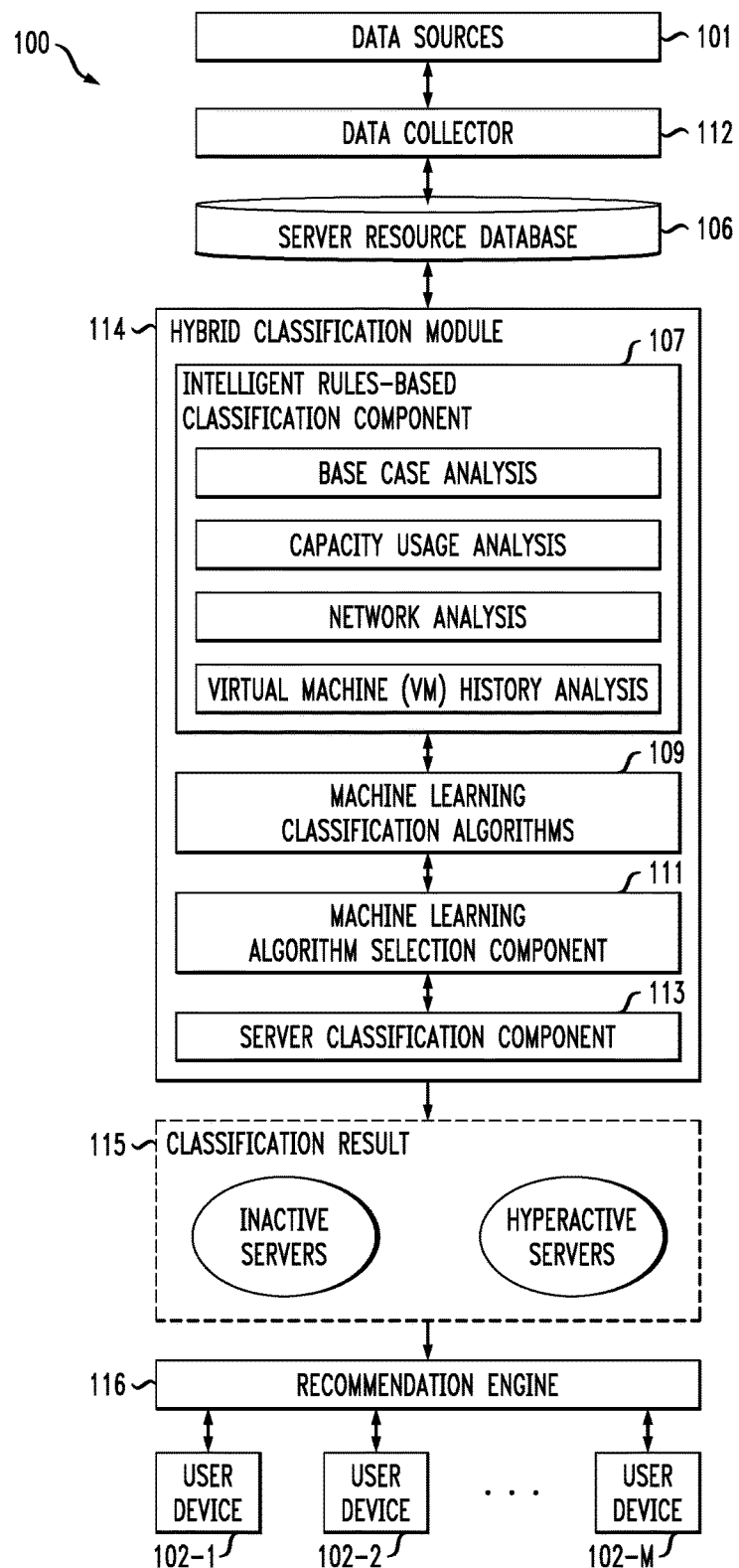
FIG. 1 shows an information processing system configured for automated server classification in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 can be coupled to a network, where the network in such an embodiment is assumed to represent a sub-network or other related portion of the larger computer network 100.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

In one or more embodiments, the above-mentioned network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also coupled to such a network are components of an automated server classification system including data collector 112, hybrid classification module 114, and recommendation engine 116. It is to be appreciated that, while the example embodiment of FIG. 1 illustrates such components as being implemented separately in a network, one or more embodiments can include incorporating two or more such components within a single system connected to the network.

As additionally illustrated in FIG. 1, information processing system 100 can include a collection of one or more data sources 101 as well as a server resource database 106. More specifically, in at least one embodiment, data sources 101 can include a monitoring software tool application programming interface (API), one or more target hosts, etc., and data collector 112 can use data from such data sources 101 to perform feature extraction with respect to data features such as CPU, memory, input-output (IO) analysis, host name, IP address, timestamps, running processes, network connection ports, connection state, login history, etc. Data collector 112 can then store such obtained data in server resource database 106.

The server resource database 106 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

As also depicted in FIG. 1, at least portions of the data from the server resource database 106 can be obtained and utilized by hybrid classification module 114, which can include multiple sub-elements. For example, as illustrated in the FIG. 1 embodiment, hybrid classification module 114 can include an intelligent rules-based classification component 107, machine learning classification algorithms 109, machine learning algorithm selection component 111, and server classification component 113. More specifically, using data obtained from server resource database 106, intelligent rules-based classification component 107 can carry out one or more analyses such as, for example, a base case analysis, a capacity usage analysis (processing data related to, for example, running processes, CPU, memory, and disk information), a network analysis (e.g., inbound and outbound), and a VM server history analysis.

Output from the intelligent rules-based classification component 107 (e.g., results from one or more of the above-noted analyses) can be provided, along with at least a portion of the machine learning classification algorithms 109, to machine learning algorithm selection component 111. Machine learning classification algorithms 109 can include, for example, at least one random forest algorithm, at least one support vector machine (SVM) algorithm, at least one K-nearest neighbors (KNN) algorithm, and/or at least one decision tree algorithm. As used herein, random forest algorithms refer to ensemble learning methods for classification and regression. Such a method includes the use of a collection of individual decision trees that operate as an ensemble. As also used herein, SVM algorithms refer to supervised machine learning models that use at least one classification algorithm for two-group classification problems. Additionally, KNN algorithms refer to supervised machine learning algorithms that can be used to solve classification and regression problems.

Referring again to FIG. 1, machine learning algorithm selection component 111 uses at least a portion of data provided by intelligent rules-based classification component 107 and a confusion matrix to determine and/or identify the best machine learning classification algorithm from the set of algorithms 109 using one or more generated algorithm performance and/or feature scores (e.g., a recall score, a precision score, an F-score, etc.). As used herein, a confusion matrix refers to a performance measurement for a machine learning classification problem wherein output can include two or more classes. For example, a confusion matrix can include a table with multiple different combinations of predicted and actual values. Also, by way of illustration, precision refers to a measure to determine how accurate and/or precise an algorithm is (e.g., out of those values predicted as positive, identifying how many of the values are actually positive). Also, recall refers to an algorithm metric related to selecting the best algorithm when there is a high cost associated with a false negative, and F-score refers to a measure related to seeking a balance between precision and recall in an attempt to ensure there is a balance measurement for algorithm selection.

As further depicted in FIG. 1, using the machine learning classification algorithm selected by component 111, server classification component 113 performs the classification for server activity for the server(s) in question. The classification result 115 generated by server classification component 113 can include, by way merely of example, identification of one or more servers classified as inactive (e.g., servers with relevant values equal to or less than 50% of maximum values) and identification of one or more servers classified as hyperactive, very active, or highly active (e.g., servers with relevant values equal to or greater than 80% of maximum values). Based at least in part of this classification result 115, recommendation engine 116 can perform one or more automated actions including, for example, automated actions in connection with user devices 102. Such automated actions can include, for instance, generating and outputting notifications to server owners, initiating one or more reclamation operations, initiating one or more decommission operations, initiating one or more add-on operations with respect to one or more servers, etc.

Also associated with elements 112, 114 and/or 116 can be one or more input-output devices, which illustratively comprise keyboards, displays or other types of input-output devices in any combination. Such input-output devices can be used, for example, to support one or more user interfaces to elements 112, 114 and/or 116, as well as to support communication between elements 112, 114 and/or 116 and other related systems and devices not explicitly shown.

Additionally, elements 112, 114 and 116 in the FIG. 1 embodiment are assumed to be implemented using at least one processing device. Each such processing device generally comprises at least one processor, an associated memory, and a network interface, and implements one or more functional modules for controlling certain features of elements 112, 114 and/or 116.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows elements 112, 114 and/or 116 to communicate over a network with the user devices 102, and illustratively comprises one or more conventional transceivers.

As noted, it is to be appreciated that this particular arrangement of elements 112, 114 and 116 illustrated in the FIG. 1 embodiment is presented by way of example only, and alternative arrangements can be used in other embodiments. For example, the functionality associated with elements 112, 114 and/or 116 in other embodiments can be combined into a single module, or separated across a larger number of modules. As another example, multiple distinct processors can be used to implement different ones of elements 112, 114 and/or 116 or portions thereof. Also, at least portions of elements 112, 114 and/or 116 may be implemented at least in part in the form of software that is stored in memory and executed by a processor.

It is to be understood that the particular set of elements shown in FIG. 1 for server classification using machine learning techniques is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of data collector 112, hybrid classification module 114, recommendation engine 116, and server resource database 106 can be on and/or part of the same system and/or processing platform.

An exemplary process utilizing data collector 112, hybrid classification module 114, and recommendation engine 116 in an example information processing system 100 will be described in more detail with reference to the flow diagram of FIG. 10.

Accordingly, at least one embodiment includes using a machine learning classification model to proactively determine and/or identify server resource levels and/or activity. As detailed herein, such an embodiment includes training a machine learning model to recognize multiple categories of servers (e.g., active servers, hyperactive servers, and inactive servers). A server that is, for example, inactive or contains excessive capacities (e.g., CPU, random access memory (RAM), disk, etc.) can be released through a decommission process or reclamation process after obtaining approval from the server owner through a continuous integration and continuous deployment (CICD) pipeline.

As further detailed herein, one or more embodiments can include implementing machine learning techniques such as one or more VM server classifier models, one or more database (DB) classifier models, and/or one or more application classifier models, which can utilize and/or be trained using historical data (e.g., using six months VM server history reports, etc.). Such historical data can be obtained from one or more sources including, for example, virtual environment tools (e.g., a vROps API), monitoring tools (e.g., a Zabbix API), etc. One or more such embodiments can include implementing a dashboard to capture data from such sources via at least one machine learning API.

Accordingly, at least one embodiment includes leveraging machine learning techniques to learn one or more patterns of server utilization, and, based at least in part on such learning, intelligently triggering one or more automated actions related, for example, to server decommissioning and/or server reclamation. One or more embodiments include attempting to address challenges in an infrastructure organization including overprovisioning of resources and decommissioning of infrastructure (which, for example, can create outages risks due to lack of visibility of the infrastructure foundational activities versus true application activities). Such an embodiment includes determining and/or identifying server resource utilization proactively using a hybrid approach of machine learning techniques and intelligent rule-based classification. Data used in such an embodiment can include data pertaining to, for example, login history, running processes, CPU usage, RAM usage, disk usage, VM server history reports, network IO analyses, etc. Based at least in part on processing such data, server activity is classified into one of multiple categories. For example, in at least one embodiment, such categories can include hyperactive servers and inactive servers.

As illustrated in FIG. 1 and further detailed herein, one or more embodiments include implementing a lightweight data collector, which obtains data from a variety of data sources such as, for example, one or more server monitoring tools (e.g., a Zabbix API) and one or more target hosts (e.g., using ansible playbook scripts). The data can be stored in at least one database (e.g., server resource database 106 in FIG. 1, which can include, for example, a Mongo repository) for further analysis and/or classification.

As also illustrated in FIG. 1, at least one embodiment includes implementing a hybrid classification module which can include intelligent rule-based classification and machine learning classification. Such rule-based classification, in one or more embodiments, acts as the first smart layer of classification by examining server data related to, for example, login history, active running processes, network connection(s) to external application(s), as well as other data-based rules. Accordingly, a server that is truly inactive (e.g., a server with no recent login history data, no active running processes, and no network connections to external applications) will be classified as an inactive server (and vice versa) before moving forward to the machine learning classification stage.

At the machine learning classification stage, a set of multiple machine learning classification algorithms are applied to one or more datasets from the repository. The resulting classification results are then used in confusion matrix measurement scores to select the best and/or most accurate classification algorithm (from among the set). When the result set is classified by the selected model, a recommendation engine can perform one or more automated actions such as, for example, notifying at least one server owner by sending out at least one recommended suggestion related to the server classification.

FIG. 2 shows an example code snippet for implementing at least a portion of a data collection mechanism in an illustrative embodiment. In this embodiment, example code snippet 200 is executed by or under the control of at least one processing system and/or device. For example, the example code snippet 200 may be viewed as comprising a portion of a software implementation of at least part of data collector 112 of the FIG. 1 embodiment.

The example code snippet 200 illustrates using a default Zabbix API in connection with printing monitored host identifying information and printing monitored host CPU utilization data. More specifically, code snippet 200 illustrates obtaining VM server data (e.g., VM server activity such as CPU, RAM, hard disk, log data, etc.) from Zabbix using Zabbix API endpoints. A hostname is used to obtain system CPU utilization data from a Zabbix history log for monitored hosts. Subsequently, code snippet 200 includes returning the CPU utilization rate to the main caller in the program. Accordingly, code snippet 200 details an example embodiment which includes extracting raw VM server data from a Zabbix monitoring tool, wherein such data can then be stored in a database (e.g., server resource database 106 in the FIG. 1 embodiment).

It is to be appreciated that this particular example code snippet shows just one example implementation of a data collection mechanism, and alternative implementations of the process can be used in other embodiments.

As described herein, once relevant data are obtained, a hybrid approach for classifying server activity is implemented that includes intelligent rule-based classification filtering and processing data using machine learning techniques to accurately identify whether a server is hyperactive or inactive. For example, in one or more embodiments, a collected dataset is processed using an intelligent rule-based classification mechanism before passing at least a portion of the dataset to one or more machine learning algorithms. In such an embodiment, example rules used in making a server activity classification can include the following: no login activities for a target VM server over the last six months (determined, e.g., by analyzing the login history) indicates a likely inactive server; no significant processes running on the target VM server (e.g., the current processes are not utilizing more than 20% of CPU usage and memory) indicates a likely inactive server; no network connection to an external application (determined, e.g., by analyzing the network IO and port information) indicates a likely inactive server; and no VM server reboot over the last six months indicates a likely inactive server.

After such a rule-based classification, at least a portion of the collected dataset is classified using previously-trained models based on multiple different classification algorithms (e.g., random forest, SVM, KNN, and decision trees). In at least one embodiment, a confusion matrix for a two-class (inactive server versus hyperactive server) classification measurement is used to select the best model. The confusion matrix measurement scores can include, for example, precision, recall, and F-score measures. Accordingly, a model with the highest score can be selected to classify the server activity at the final stage for the dataset.

FIG. 3 shows an example confusion matrix 300 used for algorithm selection in an illustrative embodiment. Such an example confusion matrix 300 can be used to calculate the accuracy of each machine learning algorithm model by using recall, precision, and F-score measures. In such an embodiment, to calculate how many of the true positive (TP) values the different machine learning algorithm algorithms capture, formulas, such as the following examples, can be used:

Recall=$TP/(TP+FN)$, wherein $FN$ represents false negative values;

Precision=$TP/(TP+FP)$, wherein $FP$ represents false positive values; and $F$-score=$(2*Precision*Recall)/(Precision+Recall)$.

By way merely of illustration, consider the following example use case. Consider a dataset of 100 servers to which a random forest classification algorithm is applied, and the algorithm predicts 90 positive class predictions correctly and 10 incorrectly. Hence, the recall score for the random forest algorithm is 90/(90+10)=0.9. Consider also an SVM classification algorithm applied to the dataset of 100 servers, wherein the algorithm predicts 80 positive class predictions correctly and 20 incorrectly. Hence, the recall score for SVM is 0.8. Additionally, consider a KNN classification algorithm used for processing the dataset of 100 servers, wherein the algorithm predicts 85 positive class predictions correctly and 15 incorrectly. Hence, the recall score for KNN is 0.85. Finally, in this example embodiment, consider a decision tree algorithm used for processing the dataset of 100 servers, wherein the algorithm predicts 60 positive class predictions correctly and 40 incorrectly. Hence, the recall score for decision tree is 0.6.

Also, as detailed herein, such an embodiment can include applying a precision formula to the four classification algorithms and calculating a final F-score. In such an embodiment, the F-score measure can range from 0.0 to 1.0, wherein the highest (1.0) represents the best score. Thus, in connection with the above example, random forest is the most accurate classification algorithm and, as such, will be selected and used to train a model for server classification.

Once the model is used to classify the data, each corresponding server is identified as being either hyperactive or inactive, and based on such classifications, a recommendation engine (implemented, for example, using content-based filtering) will perform one or more automated actions such as, e.g., triggering a notification to suggest reclaiming a given inactive server and/or decommission a given inactive server, or adding-on one or more new and/or additional resources for a given hyperactive server.

FIG. 4 shows an example table 400 of server labels in an illustrative embodiment. By way of illustration, FIG. 4 depicts labels of: true hyperactive server, represented by high usage with application or database running processes; false hyperactive server, represented by false high used due to update and security agents running activity; true inactive server, represented by true low usage; and false inactive server, represented by low usage with minor application or database running activity.

Figure 5:
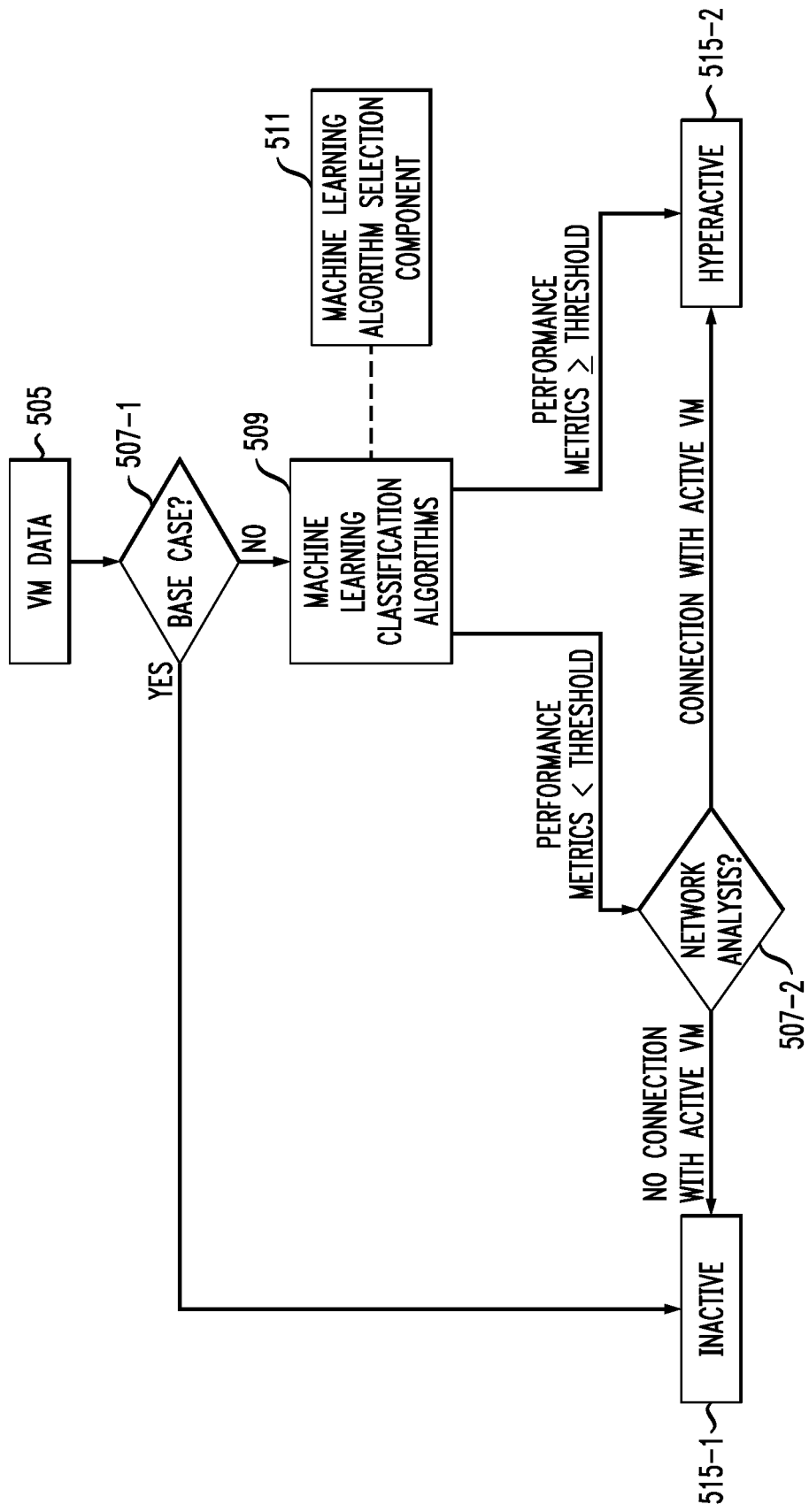
FIG. 5 shows an example of how a VM server data flow is processed using a hybrid classification module in an illustrative embodiment.

FIG. 5 shows an example of how a VM server data flow is processed using a hybrid classification module (such as, for example, element 114 in FIG. 1) in an illustrative embodiment. As illustrated, when VM server data 505 are sourced from a repository (e.g., server resource database 106 in FIG. 1), a base case analysis 507-1 is carried out in connection with analyzing at least a portion of the VM server data 505. In such an example embodiment, rules for the base case analysis 507-1 can include the following: no login activities for a VM server over the past six months indicates an inactive VM, no significant processes (e.g., application processes) running on the VM server indicates an inactive VM server, no established connections with other external applications and/or VMs during data collection period indicate an inactive VM, and no reboot of the VM server over the past six months indicate an inactive VM. If the base case analysis 507-1 results in a positive determination (e.g., the VM server has no login activities, no significant processes running, no established connections, no reboot, etc.), a classification result of inactive 515-1 is generated and/or output for the given VM server.

If the base case analysis 507-1 results in a negative determination (e.g., the VM server has login activities, significant processes running, established connections, reboot, etc.), the workflow continues to selecting, via machine learning algorithm selection component 511, an algorithm from the set of machine learning classification algorithms 509. For example, for purposes of illustration, assume that component 511 selects an SVM classification algorithm from the set of machine learning classification algorithms 509 to process performance metrics such as, e.g., percentage of CPU usage, network IO usage, and percentage of memory used by significant user processes. Subsequently, as illustrated in FIG. 5, if the determination made by the selected algorithm is a performance metric measure below a given threshold (e.g., zero), then the workflow continues to carry out a network analysis 507-2 for detecting any active network connection with an active VM. If the determination is a performance metric measure equal to or above the given threshold (e.g., one), then a classification result of hyperactive 515-2 is generated and/or output for the given VM server.

Referring again to the network analysis 507-2, such an analysis can include investigating all internal and external connections of VM servers that are classified as inactive through use and/or analysis of one or more transmission control protocol (TCP) ports (e.g., to identify specific processes and/or types of network services). For example, a classification result of hyperactive 515-2 can be determined and/or output if a network dependency with one or more active VM servers exists. If not, then a classification result of inactive 515-1 can be affirmed.

FIG. 6 shows an example table 600 of data for VM server classification in an illustrative embodiment in connection with the FIG. 5 example. The VM server data shown in table 600 would be classified as an inactive server via the base case analysis 507-1 depicted in the FIG. 5 embodiment. In other words, based on the base case analysis of the data shown in table 600, the corresponding VM server will be classified as an inactive server immediately and there will be no need to further classify the server using a machine learning algorithm.

FIG. 7 shows an example table 700 of data for VM server classification in an illustrative embodiment in connection with the FIG. 5 example. The VM server data shown in table 700 would be classified as a hyperactive server via the base case analysis 507-1 depicted in the FIG. 5 embodiment, and therefore the workflow depicted in FIG. 5 would continue to the next stage for machine learning-based classification. In other words, based on the base case analysis of the data shown in table 700, further processing is required by a selected classification model. A final confirmation of this server classification is carried out in connection with the network analysis 507-2 depicted in FIG. 5, and it would be confirmed that due to an external network connection, this server is to be classified as a hyperactive server. Such a classification could then, in one or more embodiments, be sent to a recommendation engine for further action.

FIG. 8 shows an example VM server dataset 800 used to train a model in an illustrative embodiment. By way of illustration, to train a machine model to classify a VM server as inactive or hyperactive, one or more embodiments including using VM server metrics such as, for example, CPU utilization rate, memory space usage, and network connectivity usage rate. Accordingly, such an embodiment can include compiling and/or utilizing a historical dataset such as dataset 800 to train a machine learning model to classify a given VM server activity level. After such training, the machine learning model can classify the given VM server activity based on at least a portion of data corresponding the given server metrics.

FIG. 9 shows example code snippets for training one or more models, selecting an optimal algorithm, and generating a prediction in an illustrative embodiment. In this embodiment, example code snippets 900a and 900b are executed by or under the control of at least one processing system and/or device. For example, the example code snippets 900a and 900b may be viewed as comprising a portion of a software implementation of at least part of hybrid classification module 114 of the FIG. 1 embodiment.

The example code snippet 900a illustrates loading a given dataset, partitioning and/or splitting the dataset into training and testing segments, and preparing four model machine learning algorithms (KNN, decision tree classifier, Gaussian naïve Bayes (NB), and SVM). Also, example code snippet 900b illustrates evaluating each model in a loop, comparing the algorithms, making predictions on a validation dataset using KNN, and selecting the best prediction. As used in description of one or more embodiments herein, a model is trained to classify a given server (e.g., a VM server), while a learning algorithm is used to train the model. Also, in one or more embodiments, code snippets 900a and 900b can be implemented as part of the capacity usage analysis to classify given VM server data.

It is to be appreciated that these particular example code snippets show just one example implementation of training classification models, and alternative implementations of the process can be used in other embodiments.

Figure 10:
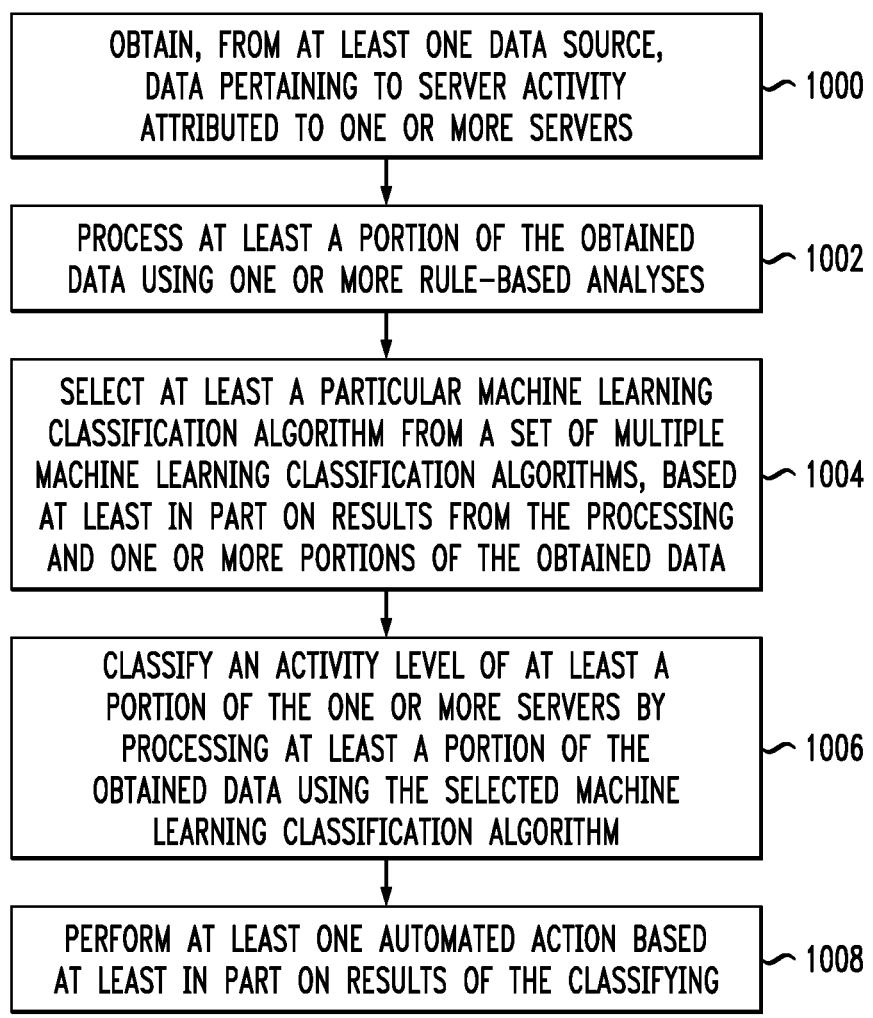
FIG. 10 is a flow diagram of a process for server classification using machine learning techniques in an illustrative embodiment.

FIG. 10 is a flow diagram of a process for server classification using machine learning techniques in an illustrative embodiment. It is to be understood that this particular process is only an example, and additional or alternative processes can be carried out in other embodiments.

In this embodiment, the process includes steps 1000 through 1008. These steps are assumed to be performed by elements 112, 114 and 116 in the FIG. 1 embodiment.

Step 1000 includes obtaining, from at least one data source, data pertaining to server activity attributed to one or more servers. In one or more embodiments, obtaining data pertaining to server activity includes obtaining data pertaining to one or more of login history, running processes, CPU usage, memory usage, disk usage, virtual machine history reports, and network input-output analysis.

Step 1002 includes processing at least a portion of the obtained data using one or more rule-based analyses. In at least one embodiment, processing at least a portion of the obtained data using one or more rule-based analyses can include performing a rule-based classification of at least a portion of the one or more servers based at least in part on data pertaining to one or more of login history, active running processes, network connections to external applications, and reboot activity.

Step 1004 includes selecting at least a particular machine learning classification algorithm from a set of multiple machine learning classification algorithms, based at least in part on results from the processing and one or more portions of the obtained data. In at least one embodiment, selecting the particular at least one machine learning classification algorithm includes determining multiple metric measurements using at least one confusion matrix and the one or more portions of the obtained data. In such an embodiment, determining multiple metric measurements includes determining, for each of the multiple machine learning classification algorithms, a recall score, a precision score, and an F-score. Additionally or alternatively, the set of multiple machine learning classification algorithms includes two or more of at least one logistic regression algorithm, at least one linear discriminant analysis algorithm, at least one random forest algorithm, at least one support vector machine algorithm, at least one K-nearest neighbors algorithm, at least one Gaussian naïve Bayes algorithm, and at least one decision tree algorithm.

Step 1006 includes classifying an activity level of at least a portion of the one or more servers by processing at least a portion of the obtained data using the selected machine learning classification algorithm. In at least one embodiment, classifying the activity level of at least a portion of the one or more servers includes classifying the activity level as one of inactive and active above a given threshold level of activity (also referred to herein as hyperactive).

Step 1008 includes performing at least one automated action based at least in part on results of the classifying. In at least one embodiment, performing at least one automated action includes initiating one or more of reclaiming at least one of the one or more servers and decommissioning at least one of the one or more servers. Additionally or alternatively, performing at least one automated action includes initiating adding resources to at least one of the one or more servers. Further, in one or more embodiments, performing at least one automated action includes training at least a portion of the multiple machine learning classification algorithms using the results of the classifying and/or generating and outputting one or more notifications, pertaining to the results of the classifying, to one or more users associated with the one or more servers.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically perform server classification using machine learning techniques. These and other embodiments can effectively overcome problems associated with the conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
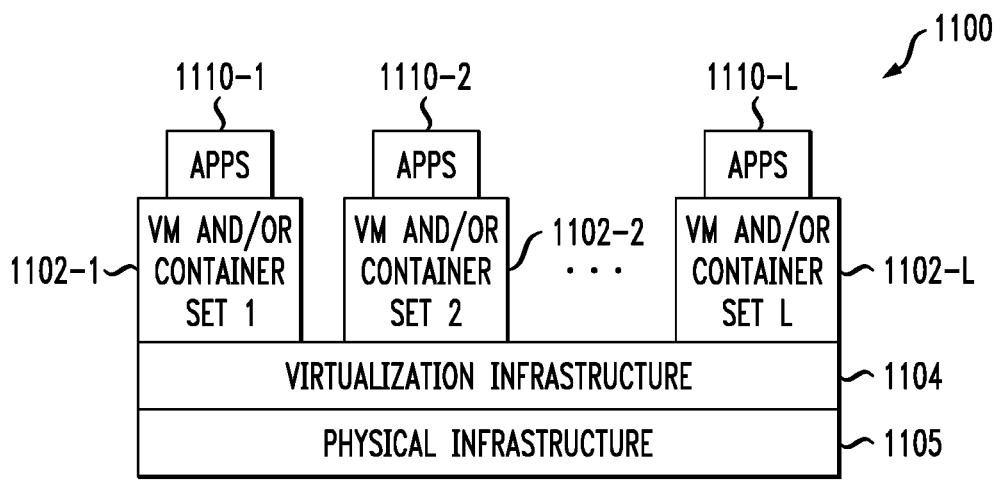
FIGS. 11 and 12 show examples of processing platforms that may be utilized to implement at least a portion of an information processing system in illustrative embodiments.
Figure 12:
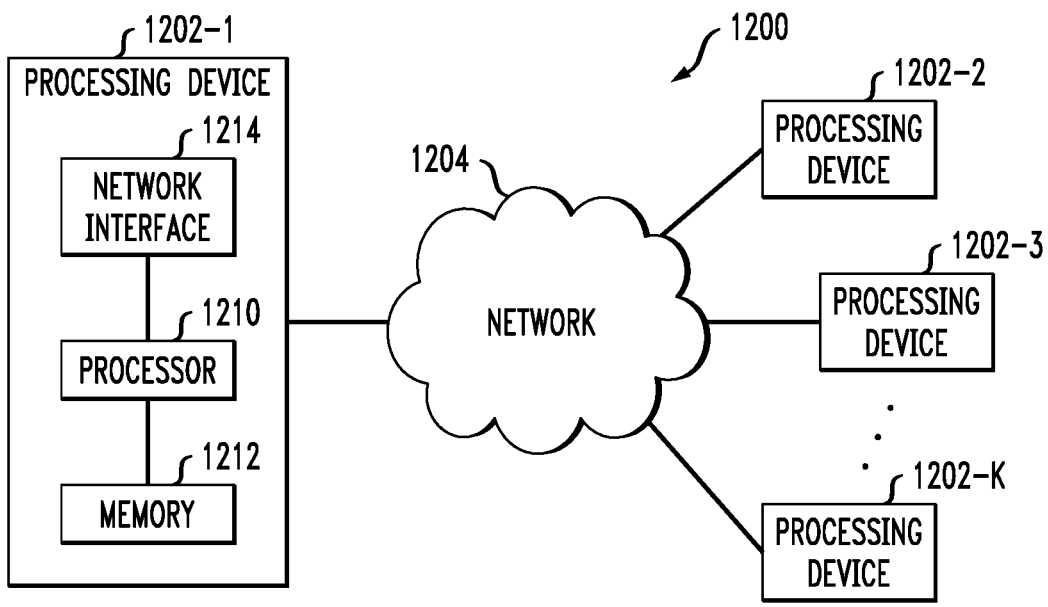

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple VMs and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a microcontroller, an application-specific integrated circuit (ASIC), a field-programmable gate array (FPGA) or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining, from at least one data source, data pertaining to server activity attributed to one or more servers;
processing at least a portion of the obtained data using one or more rule-based analyses, wherein processing at least a portion of the obtained data comprises performing at least one rule-based classification of at least a portion of the one or more servers based at least in part on data pertaining to one or more of login history and reboot activity;
selecting at least a particular machine learning classification algorithm from a set of multiple machine learning classification algorithms, based at least in part on results from the processing and one or more portions of the obtained data, wherein selecting at least a particular machine learning classification algorithm comprises determining multiple metric measurements for the multiple machine learning classification algorithms using at least one confusion matrix and the one or more portions of the obtained data;
classifying at least a portion of the one or more servers as belonging to one of multiple designated activity level-based categories by processing at least a portion of the obtained data using the selected machine learning classification algorithm, wherein the multiple designated activity level-based categories are based at least in part on usage of processing resources and memory resources relative to given amounts of processing resources and memory resources attributed to the at least a portion of the one or more servers; and
performing at least one automated action based at least in part on results of the classifying, wherein performing at least one automated action comprises initiating one or more reclamation operations relating to at least one of the one or more servers based at least in part on the results of the classifying;
wherein the method is performed by at least one processing device comprising a processor coupled to a memory.

2. The computer-implemented method of claim 1, wherein determining multiple metric measurements comprises determining, for each of the multiple machine learning classification algorithms, a recall score, a precision score, and an F-score.

3. The computer-implemented method of claim 1, wherein the set of multiple machine learning classification algorithms comprises two or more of at least one logistic regression algorithm, at least one linear discriminant analysis algorithm, at least one random forest algorithm, at least one support vector machine algorithm, at least one K-nearest neighbors algorithm, at least one Gaussian naïve Bayes algorithm, and at least one decision tree algorithm.

4. The computer-implemented method of claim 1, wherein performing at least one automated action comprises initiating one or more of reclaiming at least one of the one or more servers and decommissioning at least one of the one or more servers.

5. The computer-implemented method of claim 1, wherein performing at least one automated action comprises initiating adding resources to at least one of the one or more servers.

6. The computer-implemented method of claim 1, wherein performing at least one automated action comprises training at least a portion of the multiple machine learning classification algorithms using the results of the classifying.

7. The computer-implemented method of claim 1, wherein performing at least one automated action comprises generating and outputting one or more notifications, pertaining to the results of the classifying, to one or more users associated with the one or more servers.

8. The computer-implemented method of claim 1, wherein the classifying comprises classifying the at least a portion of the one or more servers as belonging to one of at least one inactive category and at least one active category based at least in part on a given threshold level of activity.

9. The computer-implemented method of claim 1, wherein obtaining data pertaining to server activity comprises obtaining data pertaining to one or more of login history, running processes, central processing unit (CPU) usage, memory usage, disk usage, virtual machine history reports, and network input-output analysis.

10. A non-transitory processor-readable storage medium having stored therein program code of one or more software programs, wherein the program code when executed by at least one processing device causes the at least one processing device:
to obtain, from at least one data source, data pertaining to server activity attributed to one or more servers;
to process at least a portion of the obtained data using one or more rule-based analyses, wherein processing at least a portion of the obtained data comprises performing at least one rule-based classification of at least a portion of the one or more servers based at least in part on data pertaining to one or more of login history and reboot activity;
to select at least a particular machine learning classification algorithm from a set of multiple machine learning classification algorithms, based at least in part on results from the processing and one or more portions of the obtained data, wherein selecting at least a particular machine learning classification algorithm comprises determining multiple metric measurements for the multiple machine learning classification algorithms using at least one confusion matrix and the one or more portions of the obtained data;
to classify at least a portion of the one or more servers as belonging to one of multiple designated activity level-based categories by processing at least a portion of the obtained data using the selected machine learning classification algorithm, wherein the multiple designated activity level-based categories are based at least in part on usage of processing resources and memory resources relative to given amounts of processing resources and memory resources attributed to the at least a portion of the one or more servers; and
to perform at least one automated action based at least in part on results of the classifying, wherein performing at least one automated action comprises initiating one or more reclamation operations relating to at least one of the one or more servers based at least in part on the results of the classifying.

11. The non-transitory processor-readable storage medium of claim 10, wherein determining multiple metric measurements comprises determining, for each of the multiple machine learning classification algorithms, a recall score, a precision score, and an F-score.

12. The non-transitory processor-readable storage medium of claim 10, wherein the set of multiple machine learning classification algorithms comprises two or more of at least one logistic regression algorithm, at least one linear discriminant analysis algorithm, at least one random forest algorithm, at least one support vector machine algorithm, at least one K-nearest neighbors algorithm, at least one Gaussian naïve Bayes algorithm, and at least one decision tree algorithm.

13. The non-transitory processor-readable storage medium of claim 10, wherein performing at least one automated action comprises initiating one or more of reclaiming at least one of the one or more servers and decommissioning at least one of the one or more servers.

14. An apparatus comprising:
at least one processing device comprising a processor coupled to a memory;
the at least one processing device being configured:
to obtain, from at least one data source, data pertaining to server activity attributed to one or more servers;
to process at least a portion of the obtained data using one or more rule-based analyses, wherein processing at least a portion of the obtained data comprises performing at least one rule-based classification of at least a portion of the one or more servers based at least in part on data pertaining to one or more of login history and reboot activity;
to select at least a particular machine learning classification algorithm from a set of multiple machine learning classification algorithms, based at least in part on results from the processing and one or more portions of the obtained data, wherein selecting at least a particular machine learning classification algorithm comprises determining multiple metric measurements for the multiple machine learning classification algorithms using at least one confusion matrix and the one or more portions of the obtained data;
to classify at least a portion of the one or more servers as belonging to one of multiple designated activity level-based categories by processing at least a portion of the obtained data using the selected machine learning classification algorithm, wherein the multiple designated activity level-based categories are based at least in part on usage of processing resources and memory resources relative to given amounts of processing resources and memory resources attributed to the at least a portion of the one or more servers; and
to perform at least one automated action based at least in part on results of the classifying, wherein performing at least one automated action comprises initiating one or more reclamation operations relating to at least one of the one or more servers based at least in part on the results of the classifying.

15. The apparatus of claim 14, wherein the set of multiple machine learning classification algorithms comprises two or more of at least one logistic regression algorithm, at least one linear discriminant analysis algorithm, at least one random forest algorithm, at least one support vector machine algorithm, at least one K-nearest neighbors algorithm, at least one Gaussian naïve Bayes algorithm, and at least one decision tree algorithm.

16. The apparatus of claim 14, wherein performing at least one automated action comprises initiating one or more of reclaiming at least one of the one or more servers and decommissioning at least one of the one or more servers.

* * * * *